US012566346B2

(12) United States Patent
Quan et al.

(10) Patent No.: US 12,566,346 B2
(45) Date of Patent: Mar. 3, 2026

(54) LIGHT STRIP ASSEMBLY, BACKLIGHT MODULE AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Wenqi Quan, Beijing (CN); Tian Qin, Beijing (CN); Wencheng Luo, Beijing (CN); Bo Xu, Beijing (CN); Xuetong Wang, Beijing (CN); Jinhong Zhang, Beijing (CN); Wei Ran, Beijing (CN); Yu Wang, Beijing (CN); Xin Cen, Beijing (CN); Zhi Li, Beijing (CN); Hening Zhang, Beijing (CN); Qiong Yuan, Beijing (CN); Bowen Xiong, Beijing (CN); Ke Liao, Beijing (CN); He Sun, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/857,475

(22) PCT Filed: Apr. 14, 2023

(86) PCT No.: PCT/CN2023/088443
§ 371 (c)(1),
(2) Date: Oct. 17, 2024

(87) PCT Pub. No.: WO2023/202492
PCT Pub. Date: Oct. 26, 2023

(65) Prior Publication Data
US 2025/0257855 A1 Aug. 14, 2025

(30) Foreign Application Priority Data

Apr. 19, 2022 (CN) ......................... 202220907664.6

(51) Int. Cl.
*G02F 1/13357* (2006.01)
*F21V 23/00* (2015.01)
(Continued)

(52) U.S. Cl.
CPC ...... *G02F 1/133603* (2013.01); *F21V 23/005* (2013.01); *G02F 1/133608* (2013.01);
(Continued)

(58) Field of Classification Search
CPC ........................... F21S 4/20; G02F 1/133603; G02F 1/133608; F21Y 2113/10; F21Y 2113/13;
(Continued)

(56) References Cited

U.S. PATENT DOCUMENTS

2005/0127836 A1 6/2005 Plumeyer et al.
2009/0141481 A1* 6/2009 Park .................. G02F 1/133603
362/97.3
(Continued)

FOREIGN PATENT DOCUMENTS

CN 201288957 Y 8/2009
CN 103899979 A 7/2014
(Continued)

OTHER PUBLICATIONS

International Search Report mailed on Jul. 12, 2023, received for PCT Application PCT/CN2023/088443, filed on Apr. 14, 2023, 5 pages including English Translation.
(Continued)

*Primary Examiner* — Erin Kryukova
(74) *Attorney, Agent, or Firm* — XSENSUS LLP

(57) ABSTRACT
A light strip assembly, a backlight module, and a display device are provided. The light strip assembly includes: a light board, provided with at least two different types of light-emitting unit arrays, where each type of light-emitting unit array includes a plurality of light-emitting units, different types of light-emitting units are configured to emit lights with different wavelengths, and wirings of the plurality of light-emitting units of each type of light-emitting unit array are integrated into an outlet terminal; and a control circuit board, provided with at least two connectors, where different connectors are connected to the outlet terminals of the different types of light-emitting unit arrays in one-to-one correspondence to control lighting ratios of the light-emitting units of the different types of light-emitting unit arrays.

15 Claims, 6 Drawing Sheets

(51) Int. Cl.
*F21Y 103/10* (2016.01)
*F21Y 113/17* (2016.01)
*F21Y 115/10* (2016.01)

(52) U.S. Cl.
CPC ....... *F21Y 2103/10* (2016.08); *F21Y 2113/17* (2016.08); *F21Y 2115/10* (2016.08)

(58) Field of Classification Search
CPC .............. F21Y 2113/17; F21Y 2103/10; F21Y 2115/10; F21V 23/005; H05K 1/142
See application file for complete search history.

(56) References Cited

U.S. PATENT DOCUMENTS

| | | | | |
|---|---|---|---|---|
| 2010/0052564 | A1* | 3/2010 | Park | H05B 41/2822 |
| | | | | 315/291 |
| 2011/0228196 | A1* | 9/2011 | Kubota | G02B 6/0068 |
| | | | | 362/555 |
| 2015/0062892 | A1* | 3/2015 | Krames | H05B 47/16 |
| | | | | 362/231 |
| 2020/0319514 | A1* | 10/2020 | Wu | G02F 1/133603 |
| 2022/0244597 | A1* | 8/2022 | Tong | G02F 1/133601 |

FOREIGN PATENT DOCUMENTS

| | | | | | |
|---|---|---|---|---|---|
| CN | 104524682 A | | 4/2015 | | |
| CN | 205174112 U | | 4/2016 | | |
| CN | 111544779 A | | 8/2020 | | |
| CN | 218298703 U | | 1/2023 | | |
| JP | 2009044099 A | * | 2/2009 | ....... | G02F 1/133603 |

OTHER PUBLICATIONS

Written Opinion mailed on Jul. 12, 2023, received for PCT Application PCT/CN2023/088443, filed on Apr. 14, 2023, 10 pages including English Translation.

* cited by examiner 1121          1111

1121          1111

1111 101

1121 102

1011 1011 101 141

1111 1111 3

LIGHT STRIP ASSEMBLY, BACKLIGHT MODULE AND DISPLAY DEVICE

CROSS-REFERENCE TO RELATED APPLICATIONS

The present disclosure is a U.S. National Phase Application of International Application No. PCT/CN2023/088443, filed on Apr. 14, 2023, which is based on and claims priority of China Patent Application No. 202220907664.6, entitled "LIGHT STRIP ASSEMBLY, BACKLIGHT MODULE AND DISPLAY DEVICE", submitted on Apr. 19, 2022, the contents of each are incorporated by reference in the present disclosure.

TECHNICAL FIELD

The present disclosure relates to a field of display technology, specifically to a light strip assembly and a backlight module and a display device.

BACKGROUND

It should be noted that information disclosed in the above background is only used to enhance the understanding of the background of the present disclosure, so it may include information that does not form the prior art known to those of ordinary skill in the art.

SUMMARY

The present disclosure aims to overcome shortcomings of the prior art and provide a light strip assembly and a backlight module and a display device.

According to an aspect of the present disclosure, a light strip assembly is provided and includes: a light board, provided with at least two different types of light-emitting unit arrays, where each type of light-emitting unit array includes a plurality of light-emitting units, different types of light-emitting units are configured to emit lights with different wavelengths, and wirings of the plurality of light-emitting units of each type of light-emitting unit array are integrated into an outlet terminal; and a control circuit board, provided with at least two connectors, where different connectors are connected to the outlet terminals of the different types of light-emitting unit arrays in one-to-one correspondence to control lighting ratios of the light-emitting units of the different types of light-emitting unit arrays.

In an embodiment of the present disclosure, the different types of light-emitting unit arrays are arranged on a side of the light board along a first direction, and in two different types of light-emitting unit arrays adjacent to each other, light-emitting units of a type of light-emitting unit array are disposed between light-emitting units of the other type of light-emitting unit array.

In an embodiment of the present disclosure, the different types of light-emitting units closest to each other form a light-emitting unit group, and the light-emitting unit group is set as a polycrystalline individually encapsulated LED, a polycrystalline non-individually encapsulated LED, or a plurality of single-crystal LEDs.

In an embodiment of the present disclosure, the light board includes a plurality of light sub-boards arranged along a second direction perpendicular to the first direction, the plurality of light sub-boards are nested with each other, each light sub-board is provided with a group of the light-emitting unit array, and the light-emitting units of two adjacent light sub-boards are disposed on a same plane and arranged in a column along the first direction.

In an embodiment of the present disclosure, in two adjacent light sub-boards, a plurality of first protrusions are provided on a side of a light sub-board along the first direction, the light-emitting units of the light sub-board are arranged on different first protrusions in one-to-one correspondence, a first groove is defined between two adjacent first protrusions, a plurality of second protrusions are provided on the other light sub-board along a length direction of the other light sub-board, the light-emitting units of the other light sub-board are arranged on the second protrusions in one-to-one correspondence, and the plurality of first protrusions are arranged in the first grooves in one-to-one correspondence.

In an embodiment of the present disclosure, the outlet terminals of the different types of light-emitting unit arrays are disposed on different positions of the light board along a first direction.

In an embodiment of the present disclosure, the light board is provided with two different types of light-emitting unit arrays, where a first type of light-emitting unit array emits light with a wavelength of 470-480 nanometers, and a second type of light-emitting unit array emits light with a wavelength of 415-455 nanometers. The control circuit board controls the lighting ratio of the light-emitting units of the first type of light-emitting unit array to continuously decrease over time, while the control circuit board controls the lighting ratio of the light-emitting units of the second type of light-emitting unit array to continuously increase over time.

In an embodiment of the present disclosure, at a first moment, the lighting ratio of the first type of light-emitting unit array is 95%, and the lighting ratio of the second type of light-emitting unit array is 5%. At a second moment, the lighting ratio of the first type of light-emitting unit array is 50%, and the lighting ratio of the second type of light-emitting unit array is 50%. The second moment is later than the first moment.

In an embodiment of the present disclosure, at a third moment, the lighting ratio of the first type of light-emitting unit array is 5%, and the lighting ratio of the second type of light-emitting unit array is 95%. The third moment is later than the second moment.

According to another aspect of the present disclosure, a backlight module is provided and includes the light strip assembly according to the above aspect.

According to another aspect of the present disclosure, an assembly fixture for assembling the above light strip assembly is provided. The assembly fixture includes a fixture body, at least two types of installation slots, and at least two different types of sliders. The at least two types of installation slots are sequentially arranged on a side of the fixture body along the second direction, and the installation slot is configured to arrange the light sub-board. The two adjacent different installation slots are nested with each other and are arranged at different positions of the fixture body along the second direction; different sliders are configured to be detachably connected with different light sub-boards, the slider is disposed on a side of the corresponding installation slot and may slide along a height direction of the fixture body.

In an embodiment of the present disclosure, two adjacent different installation slots are arranged at different positions along a third direction on the fixture body, the third direction is perpendicular to the first and second directions.

The light strip assembly of the present disclosure includes a light board, the light board is provided with the plurality of light-emitting unit arrays that emit lights with different wavelengths are arranged, and two connectors on the control circuit board respectively control the lighting ratios of the light-emitting units of different types of the light-emitting unit arrays, such that the light strip assembly adjusts respective irradiation ratios of different light-emitting unit arrays in a gradual manner to simulate the rhythmic lighting parameters of a whole day, and thus the display device including the light strip assembly satisfies the rhythmic effect, thereby achieving the effect of healthy display.

It should be understood that the above general description and the following detailed description are merely exemplary and explanatory, and cannot limit the present disclosure.

BRIEF DESCRIPTION OF THE DRAWINGS

The accompanying drawings, which are incorporated in and constitute a part of the description, illustrate embodiments consistent with the present disclosure and together with the description serve to explain the principles of the present disclosure. Obviously, the drawings in the following description are some embodiments of the present disclosure, and for those of ordinary skill in the art, other drawings may also be obtained from these drawings without creative efforts.

REFERENCE SIGNS

Figure 1:
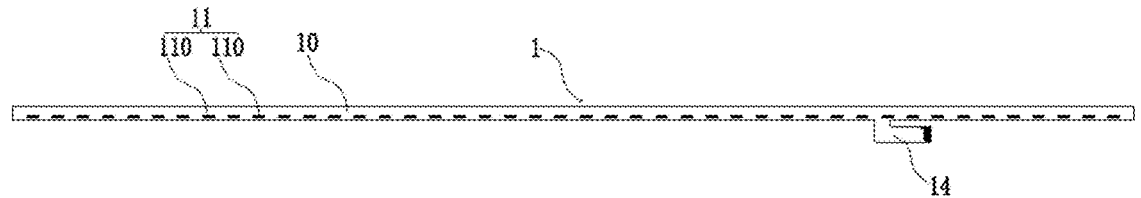
FIG. 1 is a schematic structural diagram of a light strip assembly in the related art.

1—light strip assembly, 10—light board, 101—first light sub-board, 1011—first protrusion, 102—second light sub-board, 1021—second protrusion, 11—light-emitting unit array, 110—light-emitting unit, 111—first type of light-emitting unit array, 1111—first light-emitting unit, 112—second type of light-emitting unit array, 1121—second light-emitting unit, 13—light-emitting unit group, 14—outlet terminal, 141—first outlet terminal, 142—second outlet terminal, 151—first connector, 152—second connector, 2—assembly fixture, 21—fixture body, 211—first installation slot, 2111—first clamping portion, 212—second installation slot, 2121—second clamping portion, 213—first slider, 214—second slider 3—fixing tape.

DETAILED DESCRIPTION

Exemplary implementations are hereinafter described more fully with reference to the accompanying drawings. However, the exemplary implementations may be implemented in various forms, and shall not be constructed as limited to the implementations set forth herein. On the contrary, provision of these implementations may enable the present disclosure to be more comprehensive and complete, and thereby conveying the concept of the exemplary implementations to those skilled in the art. The same reference signs in the drawings may indicate the same or similar structures, and thus their detailed descriptions are omitted. Furthermore, the accompanying drawings are merely schematic illustrations of the present disclosure, and are not necessarily drawn to scale.

In terms of spectral quality, it is proposed to support human health by adjusting the spectrum, and further proposed that lighting should support the physiological rhythm functions of alertness, sleep, and health. Daily circadian rhythms are supported through the lighting, so as to meet specific requirements for performance and health in different application scenarios, such as the work environment, a rehabilitation center, an educational facility, and the like.

CRHD (Circadian Rhythm Health Display) is a health display function proposed for the first time, aiming to utilize the human body rhythm effect to adjust the different luminous states of the display device, such that the human body is in a "sleep" or "awake" environment to achieve the effect of using the display device in a healthy way.

The light cycle is the most important physical environment for life activities, and a circadian light-dark signal moves numerous inherent physiological rhythms in the body to their own cycle. Generally, the light circadian cycle is related to signals required for animal life. The wavelength of light from lighting products that may usually affect physiological rhythms is between 460-520 nm.

Taking melatonin as an example, the melatonin serves as a type of rhythmic lighting parameter, the circadian rhythm cycle mechanism secreted by melatonin is endogenous, which was developed by human over a long period of evolution and has long been imprinted into the genes The melatonin is a multifunctional light signal that transmits environmental photoperiod information to relevant tissues and organs in the body through changes in its secretion, adapting their functional activities to external changes. The melatonin plays a very important role in regulating circadian rhythms, seasonal rhythms, and wakefulness rhythms such as sleep.

Short-wave blue light is light with a wavelength between 400 nm-480 nm, which has relatively high energy. The blue light within this wavelength may increase the amount of toxins in an macular area of the eye, seriously threatening our fundus health, and moreover, the blue light may also induce blindness.

There are 30000 photoreceptor cells in the human eye that may receive light within a certain wavelength range and recognize them as the blue light, when the light hits specific cells, the cells send a signal to the suprachiasmatic nucleus of the brain, informing the brain to turn off the secretion of melatonin, which is the initiator of sleep.

The inhibitory effect of light wavelength on melatonin synthesis is ranked in the following order: blue light>green light>yellow light>ultraviolet light>red light. The maximum inhibitory effect corresponds to blue light with a peak wavelength of 470-480 nm.

As shown in FIG. 1, in the related art, a wiring on the light strip assembly 1 is a complete set, and all the light-emitting units 110 of the light-emitting unit array 11 are integrated into a single outlet terminal 14 through series and parallel connection, which is uniformly controlled by one connector on the control circuit board. Thus, a spectral ratio output by the display device to the user's eyes is constant. However, at night, an excessive proportion of blue light (especially light with a wavelength of 470-480 nm) may inhibit melatonin secretion in the body, leading to poor sleep quality and long-term suboptimal condition.

Figures 5, 6, 7:
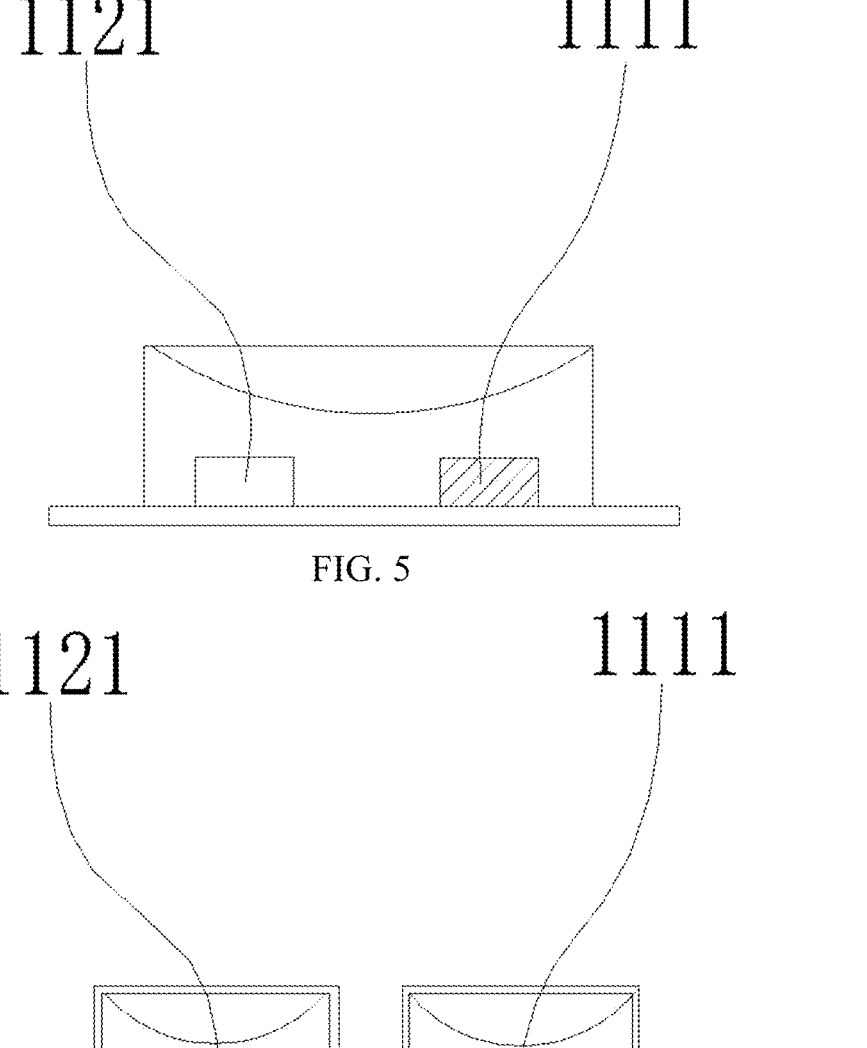
FIG. 5 is a schematic structural diagram of another light-emitting unit group involved in an embodiment of the present disclosure.
FIG. 6 is a schematic structural diagram of yet another light-emitting unit group involved in an embodiment of the present disclosure.
FIG. 7 is a schematic structural diagram of another light strip assembly involved in an embodiment of the present disclosure.
Figure 14:
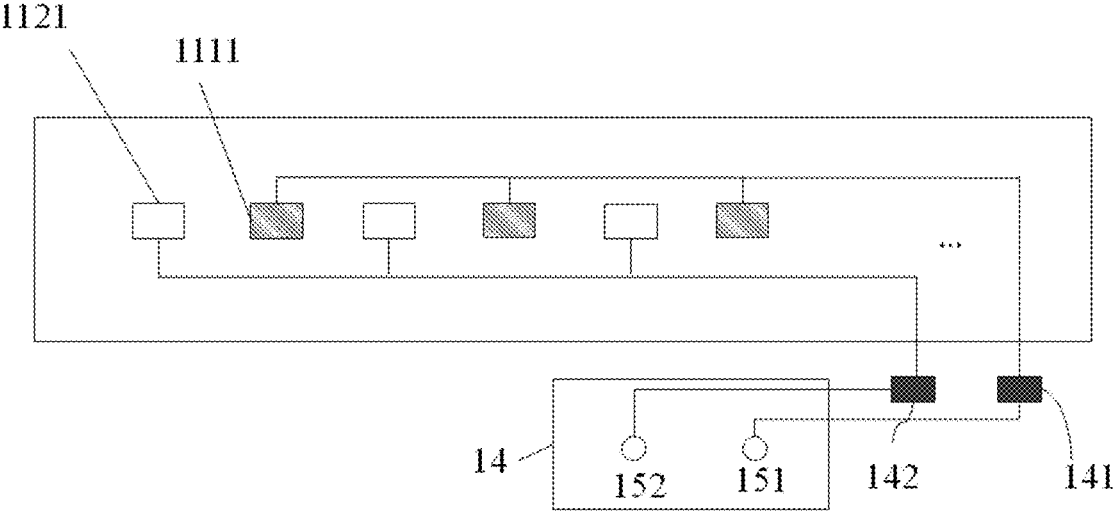
FIG. 14 is a schematic structural diagram of a light strip assembly in an embodiment of the present disclosure.

Based on this, as shown in FIGS. 7 and 14, embodiments of the present disclosure provide a light strip assembly. The light strip assembly includes a light board and a control circuit board 14 The light board is provided with at least two different types of light-emitting unit arrays, for example, a first type of light-emitting unit array 111 and a second type of light-emitting unit array 112, each type of the light-emitting unit array includes a plurality of light-emitting units, for example, the first type of light-emitting unit array 111 includes a plurality of first light-emitting units 1111, the second type of light-emitting unit array 112 includes a plurality of second light-emitting units 1121, different types of the light-emitting units are configured to emit lights with different wavelengths, and wirings of the plurality of light-emitting units of each type of the light-emitting unit array are integrated into one outlet terminal, for example, a first outlet terminal or a second outlet terminal 142; the control circuit board 14 is provided with at least two connectors, for example, a first connector 151 and a second connector 152, different connectors are connected to the outlet terminals of the different types of the light-emitting unit arrays in one-to-one correspondence to control a lighting ratio of the light-emitting units of the different types of the light-emitting unit arrays.

The plurality types of light-emitting unit arrays that emit lights with different wavelengths are arranged, and two connectors on the control circuit board respectively control the lighting ratios of the light-emitting units of different types of the light-emitting unit arrays, such that the light strip assembly adjusts respective irradiation ratios of different light-emitting unit arrays in a gradual manner to simulate the rhythmic lighting parameters of a whole day, and thus the display device including the light strip assembly satisfies the rhythmic effect.

The light strip assembly includes a light board, the light board is provided with at least two different types of light-emitting unit arrays, each type of the light-emitting unit array includes a plurality of light-emitting units, different types of the light-emitting units are configured to emit lights with different wavelengths, and wirings of the plurality of light-emitting units of each type of the light-emitting unit array are integrated into one outlet terminal.

According to a simulation requirement of the rhythm lighting parameter, the light board may be provided with, including but not limited to, two different types of light-emitting unit arrays, three different types of light-emitting unit arrays, or four different types of light-emitting unit arrays. It should be noted that this is only an example of the number of light-emitting unit arrays and the number of light-emitting unit arrays is not limited thereto, and more different types of light-emitting unit arrays may also be provided on the light board.

The different types of light-emitting unit arrays are provided on a side of the light board along a first direction. Two adjacent light-emitting unit arrays may be arranged in parallel to each other, and that is, individual light-emitting units of different light-emitting unit arrays are arranged in the same straight line along a second direction, where the second direction is perpendicular to the first direction. The two different types of light-emitting units that are adjacent to each other may also be arranged in a staggered manner, and that is, the light-emitting units of different light-emitting unit arrays are disposed in the same straight line along the first direction. It should be noted that the first direction refers to a length direction of the light board.

Regardless of whether the light-emitting units of two adjacent different light-emitting unit arrays are disposed in the same straight line along the first direction or are disposed on the same straight line along the second direction, the different types of the light-emitting units closest to each other form a light-emitting unit group.

Figure 2:
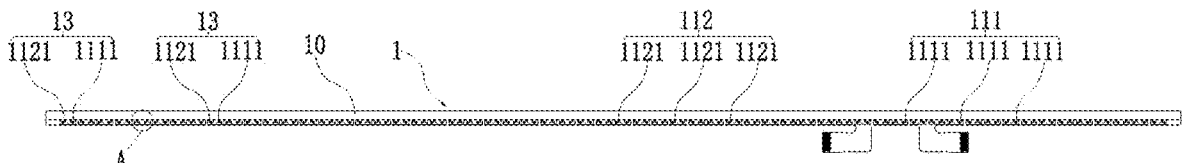
FIG. 2 is a schematic structural diagram of a light strip assembly involved in an embodiment of the present disclosure.
Figure 3:
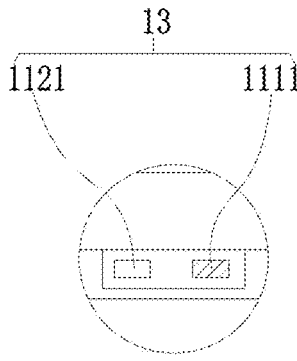
FIG. 3 is an enlarged partial view of part A in FIG. 2.

As shown in FIGS. 2 and 3, the light strip assembly 1 includes a light board 10, provided with two different types of light-emitting unit arrays, the light-emitting units of the two different types of the light-emitting unit arrays are disposed in the same straight line along the first direction. A first type of light-emitting unit array 111 includes a plurality of first light-emitting units 1111, a second type of light-emitting unit array 112 includes a plurality of second light-emitting units 1121, the first light-emitting units 1111 and the second light-emitting units 1121 emit lights with different wavelengths, respectively, the first light-emitting unit 1111 is disposed between two adjacent second light-emitting units 1121, and the second unit is disposed between two adjacent first light-emitting units 1111. The first light-emitting unit 1111 and the second light-emitting unit 1121 form a light-emitting unit group 13.

Figure 4:
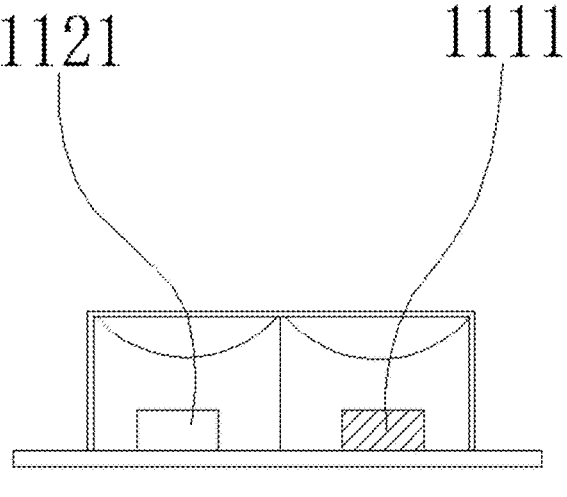
FIG. 4 is a schematic structural diagram of a light-emitting unit group involved in an embodiment of the present disclosure.

The light-emitting unit group 13 may be set as a polycrystalline individually encapsulated LED as shown in FIG. 4, a polycrystalline non-individually encapsulated LED as shown in FIG. 5, or a plurality of single-crystal LEDs as shown in FIG. 6.

It may be understood that the plurality of first light-emitting units 1111 and the plurality of second light-emitting units 1121 are disposed in the same straight line along the first direction, and that is, the first type of light-emitting unit array 111 and the second type of light-emitting unit array 112 are arranged in a staggered manner. The wirings of the plurality of light-emitting units of the first type of light-emitting unit array 111 are integrated at a first outlet terminal 141, and the wirings of the plurality of light-emitting units of the second type of light-emitting unit array 112 are integrated at a second outlet terminal 142. The first type of light-emitting unit array 111, the second type of light-emitting unit array 112, and the light board 10 are integrated into one light strip, which is easy to assemble, saves labor costs, and has high assembly alignment accuracy.

The light board may include a plurality of light sub-boards arranged along the second direction, which is perpendicular to the first direction. The plurality of light sub-boards are nested with each other, and each light sub-board is provided with a group of light-emitting unit array, and the light-emitting units of the plurality of light sub-boards are disposed on the same plane and arranged in a column along the first direction.

According to the simulation requirement of rhythm lighting parameter, it may be provided with, including but not limited to, two light sub-boards, three light sub-boards, and four light sub-boards. It should be noted that this is only an example of the number of light sub-boards and the number of light sub-boards is not limited thereto, and more light sub-boards may be provided, the plurality of light sub-boards may be nested with each other, each light sub-board is provided with a group of the light-emitting unit array, and the light-emitting unit arrays on two adjacent light sub-boards are set to be of different types.

In two adjacent light sub-boards, a plurality of first protrusions are provided on a side of a light sub-board along the first direction, the light-emitting units of the light sub-board are arranged on different first protrusions in one-to-one correspondence, a first groove is defined between two adjacent first protrusions, a plurality of second protrusions are provided on the other light sub-board along a length direction of the other light sub-board, the light-emitting units of the other light sub-board are arranged on the second protrusions in one-to-one correspondence, and the plurality of first protrusions are arranged in the first grooves in one-to-one correspondence.

It may be understood that the light-emitting units of each two adjacent light sub-boards are disposed on the same plane and arranged in a column along the first direction, and the light-emitting units of the plurality of light sub-boards may be arranged in multiple parallel columns in a direction.

Figure 8:
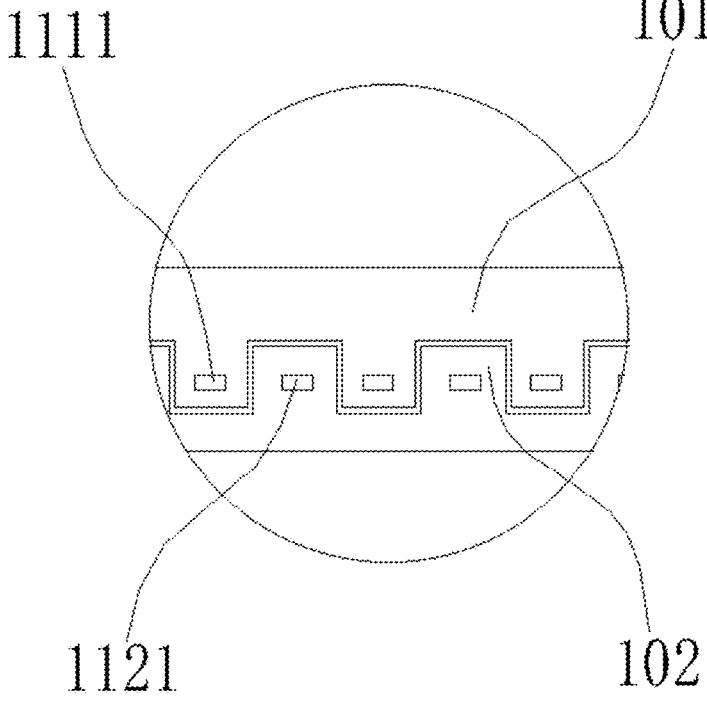
FIG. 8 is an enlarged partial view of part B in FIG. 7.
Figure 9:
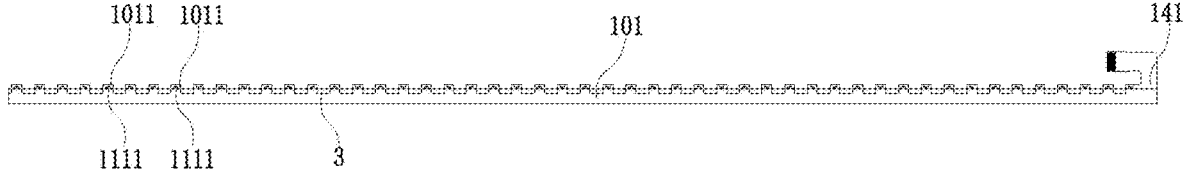
FIG. 9 is a schematic structural diagram that a first light sub-board is fitted to a fixing tape involved in in an embodiment of the present disclosure.

As shown in FIGS. 7 and 8, the light board 10 includes a first light sub-board 101 and a second light sub-board 102 arranged along a second direction, where the second direction is perpendicular to the first direction. The first light sub-board 101 and the second light sub-board 102 are nested with each other, the first light sub-board 101 is provided with a first type of light-emitting unit array 111, and the second light sub-board 102 is provided with a second type of light-emitting unit array 112. The first type of light-emitting unit array 111 includes a plurality of first light-emitting units 1111, the second type of light-emitting unit array 1121 includes a plurality of second light-emitting units 1121, the first light-emitting units 1111 are disposed on the first protrusions 1011 of the first light sub-board 101, and the second light-emitting units 1121 are disposed on the second protrusions 1021 of the second light sub-board 102, and the second protrusion 1021 is disposed in the groove formed between two first protrusions 1011.

The second protrusion 1021 is disposed between two adjacent first protrusions 1011, and thus the second light-emitting unit 1121 is disposed between two first light-emitting units 1111. The first protrusion 1011 is disposed between two adjacent second protrusions 1021, and thus the first light-emitting unit 1111 is disposed between two second light-emitting units 1121. It may be understood that the first type of light-emitting unit array 111 and the second type of light-emitting unit array 112 are arranged in a staggered manner along the first direction. The first type of light-emitting unit array 111 forms a first light strip with the first light sub-board 101, and the second type of light-emitting unit array 112 forms a second light strip with the second light sub-board 102. The first and second light strips are designed and wired separately, and the light-emitting units adopt single-crystal LEDs. The single crystal LED encapsulation is more stable and may be operated and replaced separately for poor maintenance, which saves cost.

It should be noted that regardless of whether the light strip assembly shown in FIG. 2 or FIG. 4 is adopted, the outlet terminals 14 of different light-emitting unit arrays are disposed at different positions of the light board along the first direction.

Taking that a light-emitting assembly includes two types of light-emitting unit arrays as an example, a light-emitting wavelength of the first light-emitting unit and a light-emitting wavelength of the second light-emitting unit are described below with reference to a specific rhythm lighting parameter. Usually, the first light-emitting unit emits light with a wavelength of 470-480 nanometers, while the second light-emitting unit 1121 emits light with a wavelength of 415-455 nanometers.

The control circuit board controls the lighting ratio of the light-emitting units of the first type of light-emitting unit array to continuously decrease over time, while the control circuit board controls the lighting ratio of the light-emitting units of the second type of light-emitting unit array to continuously increase over time.

To simulate the physiological rhythm requirement for a whole day, an irradiation ratio of the first type of light-emitting unit array and an irradiation ratio of the second type of light-emitting unit array are respectively adjusted in the form of gradual scrolling, which is ultimately reflected in a wavelength of a light emitted by the light strip assembly 1, so as to meet the actual requirement of rhythm lighting parameter for a client terminal at different time periods.

Light emitting modes of the light strip assembly are described below with examples.

At a first moment 8:00, the lighting ratio of the first type of light-emitting unit array is 95%, and the lighting ratio of the second type of light-emitting unit array is 5%. At a second moment 17:00, the lighting ratio of the first type of light-emitting unit array is 50%, and the lighting ratio of the second type of light-emitting unit array is 50%. The second moment is later than the first moment. At a third moment 21:00, the lighting ratio of the first type of light-emitting unit array is 5%, and the lighting ratio of the second type of light-emitting unit array is 95%. The third moment is later than the second moment.

It may be understood that the light with a wavelength of 480 nanometers is emitted most at the first moment 8:00, so the inhibitory effect on melatonin is the strongest. When the user is in a relatively sleepy time period, the light strip assembly 1 may influence the user to be in a more awake state. At the second moment 17:00, the light with the wavelength of 480 nanometers and low blue light each account for half, so the inhibitory effect on melatonin is relatively weak. Since the user is in a good mental state at this moment, the light strip assembly 1 may also influence the user to be in a more awake state. At the third moment 21:00, more low blue light is emitted, so the inhibitory effect on melatonin is the weakest, at this time, the user is in the time ready to sleep, and the light strip assembly 1 may reduce the impact on sleep.

Of course, the user may also manually set the lighting ratio of the first type of light-emitting unit array and the lighting ratio of the second type of light-emitting unit array based on his/her own mental state to meet the user's personalized requirement.

The embodiments of the present disclosure provide an assembly fixture for assembling the above light strip assembly. The assembly fixture includes a fixture body, at least two types of installation slots, and at least two different types of sliders. The at least two types of installation slots are sequentially arranged on a side of the fixture body along the second direction, and the installation slot is configured to arrange the light sub-board. The two adjacent different installation slots are nested with each other and are arranged at different positions of the fixture body along the second direction; different sliders are configured to be detachably connected with different light sub-boards, the slider is disposed on a side of the corresponding installation slot and may slide along a height direction of the fixture body.

A shape and size of the installation slot match a shape and size of the corresponding light sub-board, specifically, there may be two adjacent installation slots, one installation slot includes a plurality of first clamping portions, the first clamping portion has the same shape and size as the first protrusion; the other installation slot includes a plurality of second clamping portions, and the second clamping portion has the same shape and size as the second protrusion. Two different types of installation slots adjacent to each other may be set at different positions of the fixture body along the second direction.

Figures 10, 11:
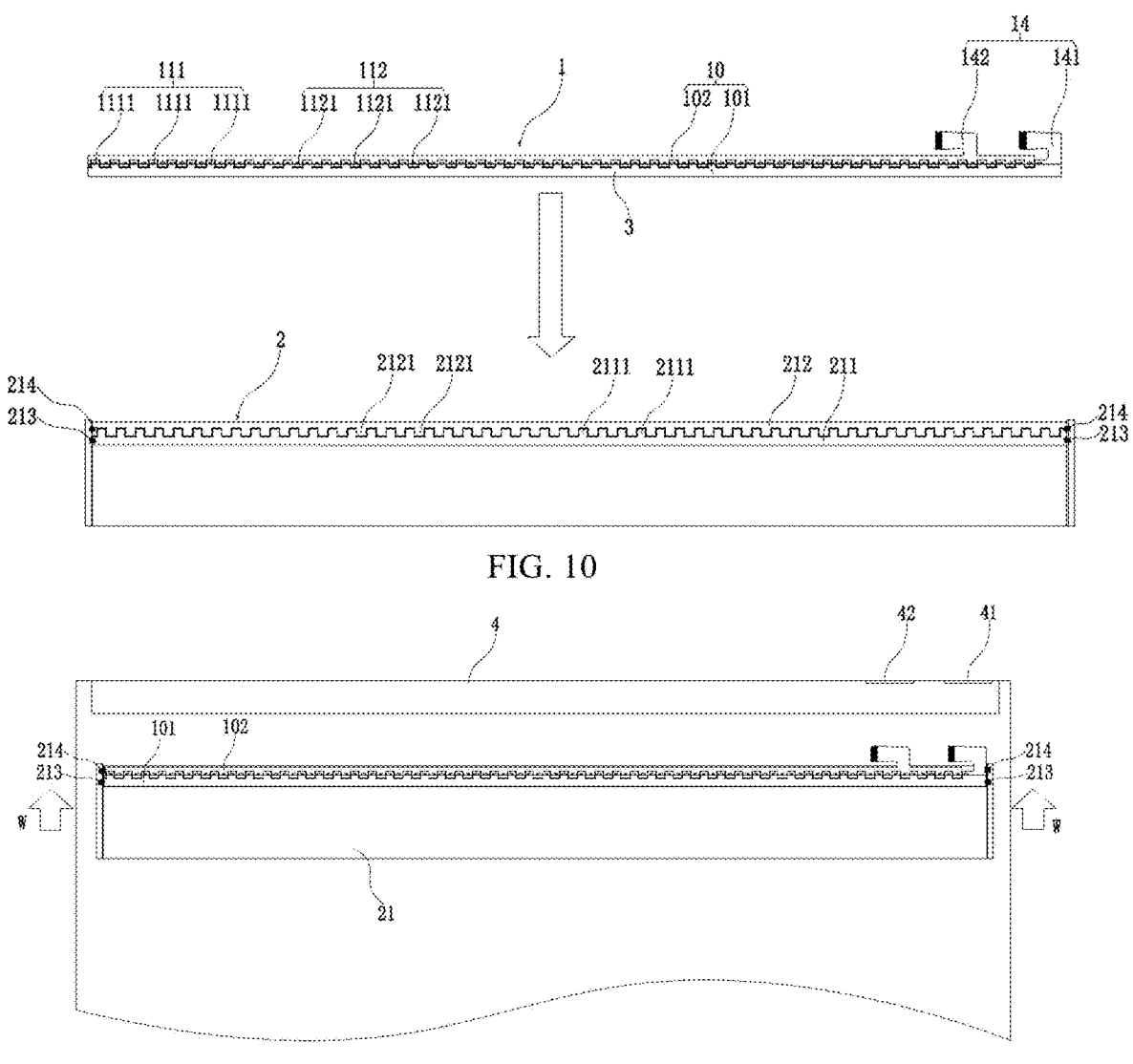
FIG. 10 is a diagram that a light strip assembly and an assembly fixture are fitted involved in an embodiment of the present disclosure.
FIG. 11 is a schematic diagram of the installation of a light strip assembly and a display back panel involved in an embodiment of the present disclosure.
Figure 12:
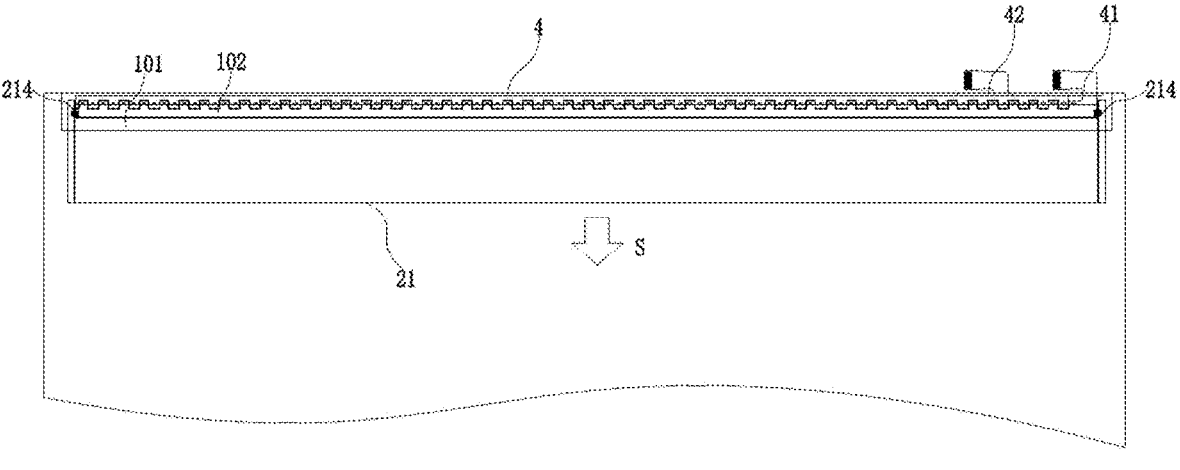
FIG. 12 is a schematic diagram of the disassembly of an assembly fixture and a light strip assembly involved in an embodiment of the present disclosure.

As shown in FIG. 10, the assembly fixture 2 includes a fixture body 21, a first installation slot 211, a second installation slot 212, a first slider 213, and a second slider 214. The first installation slot 211 and the second installation slot 212 are nested with each other and are arranged at different positions of the fixture body 21 along the second direction; the first installation slot 211 and the second installation slot 212 are sequentially arranged on a side of the fixture body 21 along the second direction.

It should be noted that the second direction is a height direction of the fixture body 21. The first installation slot 211 is configured to arrange the first light sub-board 101, and the second installation slot 212 is configured to arrange the second light sub-board 102. A height of the second installation slot 212 is higher than that of the first installation slot 211, and a height of the fixture body 21 is higher than that of the second installation slot 212.

The first slider 213 is disposed on a side of the first installation slot 211, and is configured to be detachably connected with the first light sub-board 101, the second slider 214 is disposed on a side of the second installation slot 212, and is configured to be detachably connected with the second light sub-board 102. The first slider 213 and the second slider 214 may slide along the second direction.

The first light sub-board 101 and the second light sub-board 102 may slide simultaneously, and in this case, the first installation slot 211 and the second installation slot 212 may be provided at the same position along the third direction. The first light sub-board 101 and the second light sub-board 102 may also slide separately, and in this case, the first installation slot 211 and the second installation slot 212 need to be arranged at different positions along the third direction, so as to ensure that the first light sub-board 101 and the second light sub-board 102 are staggered in the third direction without affecting each other when first light sub-board 101 and the second light sub-board 10 slide.

Assembly steps of the light strip assembly are shown in FIGS. 9 to 12:

A surface opposite to a light-emitting surface of the first type of light-emitting unit array 111 on the first light strip is attached to a fixing tape 3, and a surface opposite to a light-emitting surface of the second type of light-emitting unit array 112 on the second light strip is also attached to a fixing tape 3.

The first light strip is placed into the first installation slot 211 of the assembly fixture 2, and the first light strip is fixed with the first slider 213; the second light strip is placed into the second installation slot 212 of the assembly fixture 2, and the second light strip is fixed with the second slider 214.

The assembly fixture 2 is pushed into an interior of the U-fold in the second direction along W, then the first slider 213 is pushed upwards until the first outlet terminal 141 of the first light strip extends from a pre-set broken hole on the U-fold, and afterwards the second slider 214 is pushed upwards until the second outlet terminal 142 of the second light strip extends from another pre-set broken hole on the U-fold.

The first slider 213 slides within a first slide rail, the second slider 214 slides within a second slide rail, and both the first and second slide rails are defined with positioning notches, which may ensure that the pushing positions of the first and second light strips are consistent. After the first and second light strips are pushed into place, a release paper on a side of the fixing tape 3 away from the light-emitting surface of the first type of light-emitting unit array 111 is torn off, such that the first and second light strips are attached onto the back panel and fixed.

The first slider 213 is separated from the first light strip, and the first slider 213 is moved along an S direction in the second direction to disengage the first slider from the first light strip. The second slider 214 is separated from the second light strip, the second slider 214 is moved along the S direction in the second direction to disengage the second slider from the second light strip, and then the assembly fixture 2 is taken out.

Figure 13:
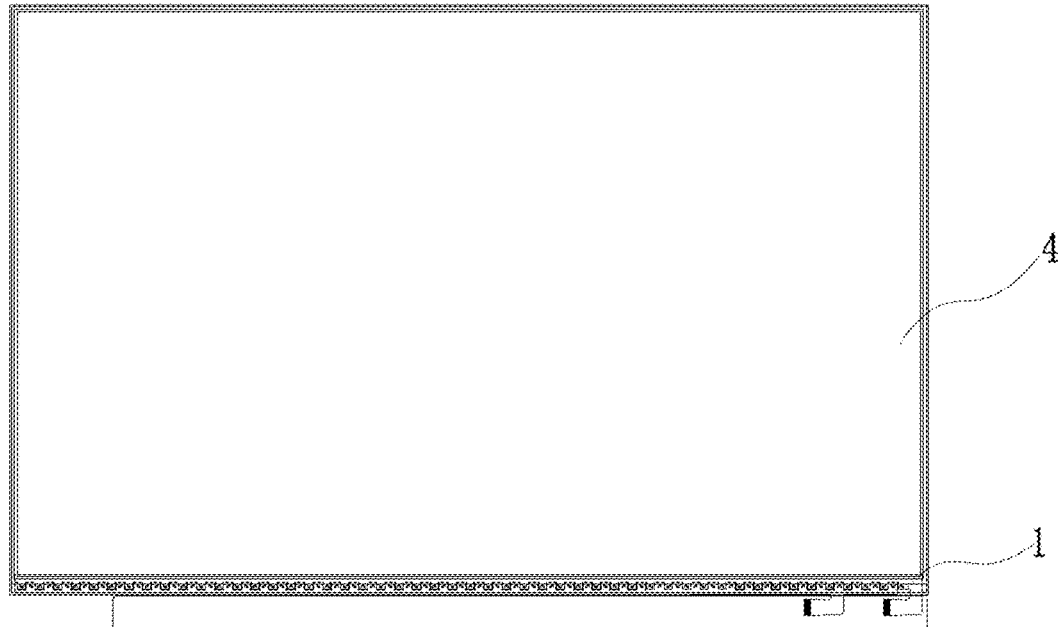
FIG. 13 is a schematic structural diagram of a display panel involved in an embodiment of the present disclosure.

The embodiments of the present disclosure provide a display device. As shown in FIG. 13, the display device includes a display panel, which may include a display back panel 4 and a backlight module. The backlight module may include the above light strip assembly 1. The beneficial effects of the display device may refer to the beneficial effects of the light strip assembly, which will not be further elaborated here.

It should be noted that the display device, in addition to the display panel, also includes other necessary components and compositions. Taking the display as an example, it may further include, in particular, a housing, a circuit board, a power cord, etc., which may be supplemented by a person skilled in the art according to the specific requirements of the use of the display device, and will not be repeated here.

Other embodiments of present disclosure will be apparent to those skilled in the art after reading the specification and implementing present disclosure disclosed herein. The present application is intended to cover any variations, purposes, or adaptations of present disclosure, which are in accordance with the general principles of present disclosure and include common general knowledge or conventional technical means in the art that are not disclosed in present disclosure. The specification and embodiments are to be regarded as illustrative only, and the real scope and spirit of present disclosure is defined by the attached claims.

What is claimed is:

1. A light strip assembly, comprising:
   a light board, provided with at least two different types of light-emitting unit arrays, wherein each type of light-emitting unit array comprises a plurality of light-emitting units of a same type configured to emit light of a same wavelength, the light-emitting units of the different types of the light-emitting unit arrays are configured to emit lights with different wavelengths, and wirings of the plurality of light-emitting units of each type of light-emitting unit array are integrated into an outlet terminal; and a control circuit board, provided with at least two connectors, wherein different connectors are connected to the outlet terminals of the different types of light-emitting unit arrays in one-to-one correspondence to control lighting ratios of the light-emitting units of the different types of light-emitting unit arrays, such that radiation ratios of the different types of the light-emitting unit arrays are respectively adjusted to simulate rhythmic lighting parameters over time;

wherein the different types of light-emitting unit arrays are arranged on a side of the light board along a first direction, and in two different types of light-emitting unit arrays adjacent to each other, light-emitting units of a type of light-emitting unit array are disposed between light-emitting units of the other type of light-emitting unit array; and wherein the light board comprises a plurality of light sub-boards arranged along a second direction perpendicular to the first direction, the plurality of light sub-boards are nested with each other, each light sub-board is provided with one light-emitting unit array, and the light-emitting units of two adjacent light sub-boards are disposed on a same plane and arranged in a column along the first direction.

2. The light strip assembly according to claim 1, wherein the different types of light-emitting units closest to each other form a light-emitting unit group, and the light-emitting unit group is set as at least one of a polycrystalline individually encapsulated LED, a polycrystalline non-individually encapsulated LED, or a plurality of single-crystal LEDs.

3. The light strip assembly according to claim 1, wherein in two adjacent light sub-boards, a plurality of first protrusions are provided on a side of a light sub-board along the first direction, the light-emitting units of the light sub-board are arranged on the plurality of first protrusions in one-to-one correspondence, a first groove is defined between two adjacent first protrusions, a plurality of second protrusions are provided on the other light sub-board along a length direction of the other light sub-board, the light-emitting units of the other light sub-board are arranged on the second protrusions in one-to-one correspondence, and the plurality of first protrusions are arranged in the first grooves in one-to-one correspondence.

4. The light strip assembly according to claim 1, wherein the outlet terminals of the different types of light-emitting unit arrays are disposed on different positions of the light board along a first direction.

5. The light strip assembly according to claim 1, wherein the light board is provided with two different types of light-emitting unit arrays, wherein a first type of light-emitting unit array emits light with a wavelength of 470-480 nanometers, and a second type of light-emitting unit array emits light with a wavelength of 415-455 nanometers.

6. The light strip assembly according to claim 5, wherein upon turning on the light strip assembly, the lighting ratio of the light-emitting units of the first type of light-emitting unit array continuously decreases from a first maximum value to a first minimum value over a predetermined time period, and the lighting ratio of the light-emitting units of the second type of light-emitting unit array continuously increases from a second minimum value to a second maximum value over the predetermined time period.

7. The light strip assembly according to claim 6, wherein at a first time point, the lighting ratio of the first type of light-emitting unit array is 95%, and the lighting ratio of the second type of light-emitting unit array is 5%; at a second time point, the lighting ratio of the first type of light-emitting unit array is 50%, and the lighting ratio of the second type of light-emitting unit array is 50%, and the second time point is later than the first time point.

8. The light strip assembly according to claim 7, wherein at a third time point, the lighting ratio of the first type of light-emitting unit array is 5%, and the lighting ratio of the second type of light-emitting unit array is 95%, and the third time point is later than the second moment.

9. A backlight module comprising a light strip assembly; wherein the light strip assembly comprises:

a light board, provided with at least two different types of light-emitting unit arrays, wherein each type of light-emitting unit array comprises a plurality of light-emitting units of a same type configured to emit light of a same wavelength, the light-emitting units of the different types of the light-emitting unit arrays are configured to emit lights with different wavelengths, and wirings of the plurality of light-emitting units of each type of light-emitting unit array are integrated into an outlet terminal; and a control circuit board, provided with at least two connectors, wherein different connectors are connected to the outlet terminals of the different types of light-emitting unit arrays in one-to-one correspondence to control lighting ratios of the light-emitting units of the different types of light-emitting unit arrays, such that radiation ratios of the different types of the light-emitting unit arrays are respectively adjusted to simulate rhythmic lighting parameters over time;

wherein the different types of light-emitting unit arrays are arranged on a side of the light board along a first direction, and in two different types of light-emitting unit arrays adjacent to each other, light-emitting units of a type of light-emitting unit array are disposed between light-emitting units of the other type of light-emitting unit array; and wherein the light board comprises a plurality of light sub-boards arranged along a second direction perpendicular to the first direction, the plurality of light sub-boards are nested with each other, each light sub-board is provided with one light-emitting unit array, and the light-emitting units of two adjacent light sub-boards are disposed on a same plane and arranged in a column along the first direction.

10. The display device according to claim 9, wherein the different types of light-emitting units closest to each other form a light-emitting unit group, and the light-emitting unit group is set as at least one of a polycrystalline individually encapsulated LED, a polycrystalline non-individually encapsulated LED, or a plurality of single-crystal LEDs.

11. The backlight module according to claim 9, wherein in two adjacent light sub-boards, a plurality of first protrusions are provided on a side of a light sub-board along the first direction, the light-emitting units of the light sub-board are arranged on the plurality of first protrusions in one-to-one correspondence, a first groove is defined between two adjacent first protrusions, a plurality of second protrusions are provided on the other light sub-board along a length direction of the other light sub-board, the light-emitting units of the other light sub-board are arranged on the second protrusions in one-to-one correspondence, and the plurality of first protrusions are arranged in the first grooves in one-to-one correspondence.

12. The backlight module according to claim 9, wherein the outlet terminals of the different types of light-emitting unit arrays are disposed on different positions of the light board along a first direction.

13. The backlight module according to claim 9, wherein the light board is provided with two different types of light-emitting unit arrays, wherein a first type of light-emitting unit array emits light with a wavelength of 470-480 nanometers, and a second type of light-emitting unit array emits light with a wavelength of 415-455 nanometers.

14. A display device comprising a backlight module, wherein the backlight module comprises a light strip assembly; and the light strip assembly comprises:

a light board, provided with at least two different types of light-emitting unit arrays, wherein each type of light-emitting unit array comprises a plurality of light-emitting units of a same type configured to emit light of a same wavelength, the light-emitting units of the different types of the light-emitting unit arrays are configured to emit lights with different wavelengths, and wirings of the plurality of light-emitting units of each type of light-emitting unit array are integrated into an outlet terminal; and a control circuit board, provided with at least two connectors, wherein different connectors are connected to the outlet terminals of the different types of light-emitting unit arrays in one-to-one correspondence to control lighting ratios of the light-emitting units of the different types of light-emitting unit arrays, such that radiation ratios of the different types of the light-emitting unit arrays are respectively adjusted to simulate rhythmic lighting parameters over time;

wherein the different types of light-emitting unit arrays are arranged on a side of the light board along a first direction, and in two different types of light-emitting unit arrays adjacent to each other, light-emitting units of a type of light-emitting unit array are disposed between light-emitting units of the other type of light-emitting unit array; and wherein the light board comprises a plurality of light sub-boards arranged along a second direction perpendicular to the first direction, the plurality of light sub-boards are nested with each other, each light sub-board is provided with one light-emitting unit array, and the light-emitting units of two adjacent light sub-boards are disposed on a same plane and arranged in a column along the first direction.

15. The backlight module according to claim 14, wherein the different types of light-emitting units closest to each other form a light-emitting unit group, and the light-emitting unit group is set as at least one of a polycrystalline individually encapsulated LED, a polycrystalline non-individually encapsulated LED, or a plurality of single-crystal LEDs.

\* \* \* \* \*